March 7, 1967 W. H. GILLE ET AL 3,308,340
CURRENT CONTROL APPARATUS HAVING PHASE CONTROLLED
MEANS FOR VARIABLY CONTROLLING THE
PERIOD OF CONDUCTION Filed May 4, 1964

INVENTORS
WILLIS H. GILLE,
BY RALPH I. ANDERSON

Frederick E. Lange
ATTORNEY

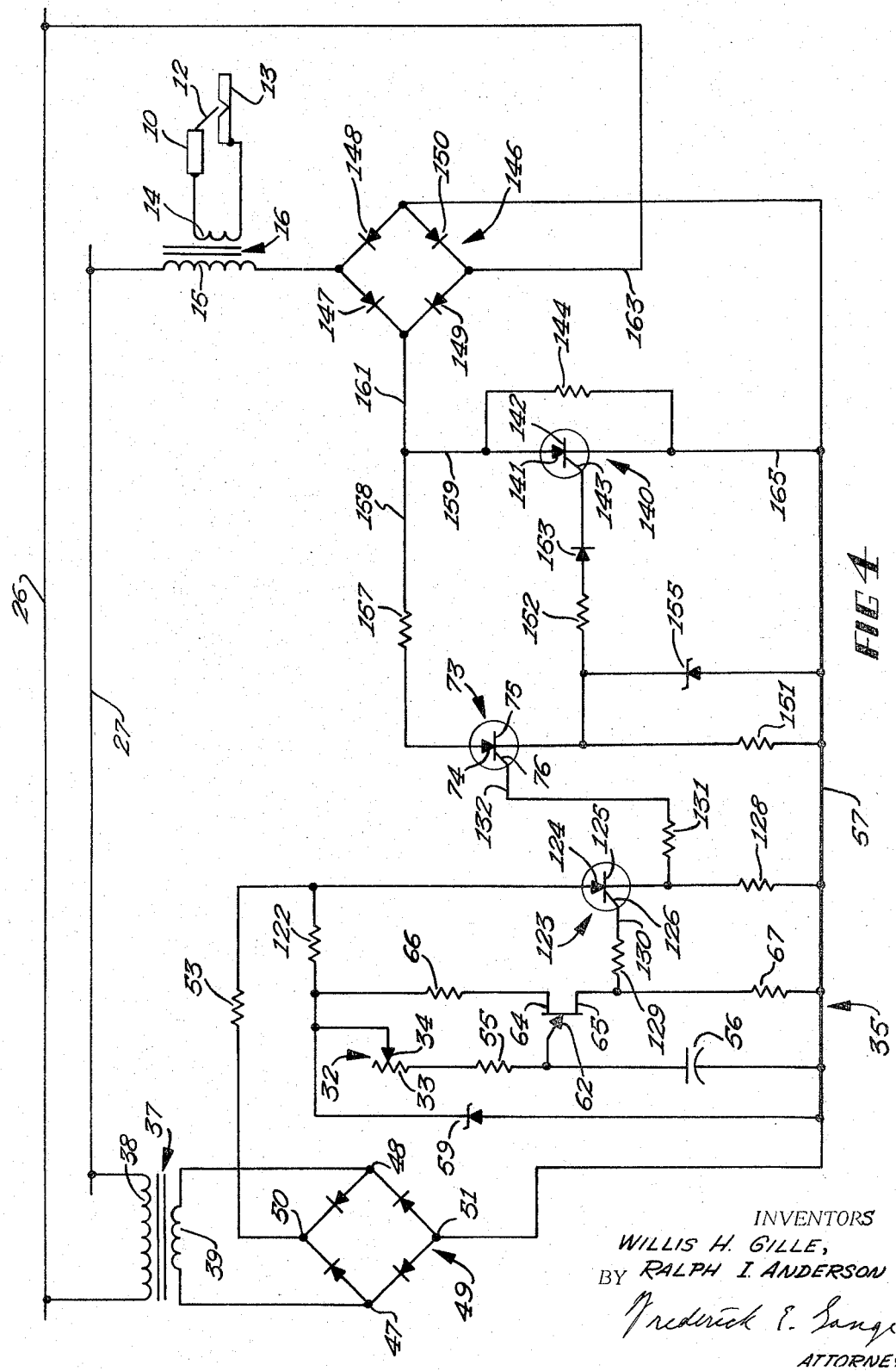

United States Patent Office 3,308,340
Patented Mar. 7, 1967

3,308,340
CURRENT CONTROL APPARATUS HAVING PHASE CONTROLLED MEANS FOR VARIABLY CONTROLLING THE PERIOD OF CONDUCTION
Willis H. Gille, St. Paul, and Ralph I. Anderson, Minneapolis, Minn., assignors to Marquette Corporation, Minneapolis, Minn., a corporation of Delaware
Filed May 4, 1964, Ser. No. 364,625
13 Claims. (Cl. 315—205)

The present invention relates to a current control apparatus and more particularly to such an apparatus designed for use with an inductive load.

It has been proposed in connection with variably controlling large current flows to provide rectifying or other current control devices having control elements and which are effective when a predetermined voltage is applied to said control elements to become conductive and to remain conductive as long as the voltage of the correct polarity is applied across said current control devices regardless of the subsequent voltage applied to the control elements. A typical rectifying device of this type is a silicon controlled rectifier. Since the control element loses control once the rectifier is fired, the conventional way of controlling such a device is to control the point in the voltage cycle at which a control voltage is first applied to the control element. In the past, it has been proposed to derive the voltage for controlling the phase of the voltage pulse from the voltage across the rectifier. This has the advantage that as soon as the rectifier becomes conductive with the resultant drop in voltage across it, the voltage on the pulse forming device ceases so as to abruptly terminate the voltage pulse on the control element. This is desirable in that such rectifiers are best operated when the control pulse applied to the control element is applied for only a short period of time.

We have discovered, however, that such a control system does not work well with inductive controls because of the fact that there is a phase shift produced by the inductive load which varies depending upon the current flowing through the load. The result is that the different half cycles vary in phase relationship from each other and an erratic control results. An object of the present invention is to provide such a current control using a current control device or devices of the type discussed above in which the phase of the control pulse is controlled by means energized independently of the voltages across the rectifier so that the phase position of the control pulse is unaffected by the shifting of phase of the voltage across the rectifier and in which the effect of the controlling means is maintained in any half cycle until the silicon controlled rectifier fires.

A further object of the present invention is to provide such a current control which is particularly adaptable for use with welding apparatus employing a welding transformer.

A further object of the present invention is to provide such a system in which a single set of components are employed to provide the pulses for successive half cycles so that the same pulse is applied to each half cycle regardless of variations in characteristics of the components.

A further object of the invention is to provide such an arrangement in which means are provided for preventing the control pulse from being effective to cause firing in more than one half cycle.

A still further object of the present invention is to provide an arrangement in which a single rectifier is employed to control the current flow through the inductive load in both half cycles, this rectifier being controlled by a control pulse whose phase is determined by our novel apparatus.

Other objects of the invention will become apparent from a consideration of the accompanying specification, claims and drawing of which:

FIGURE 4 is a still further modification in which a single rectifier is used to control the current flow in two successive half cycles.

Figure 1:
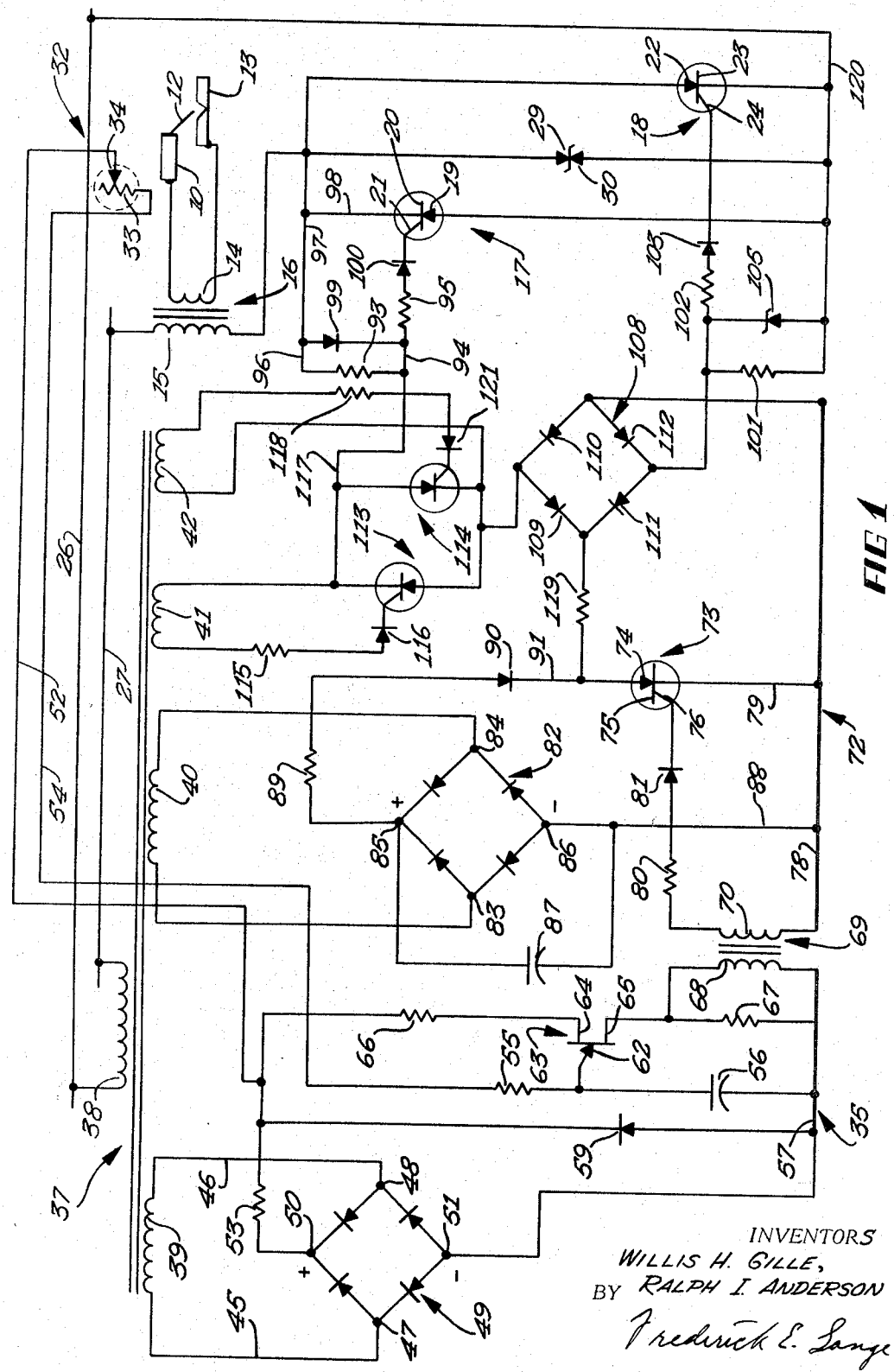
FIGURE 1 is a schematic view of a preferred form of our invention as applied to a control for an alternating current welder.

Referring more specifically to FIGURE 1, I have shown a conventional alternating current welding arrangement comprising an electrode 12 which is adapted to cooperate with work pieces 13. The electrode 12 is supported by a suitable electrode support 10 which is connected to the upper terminal of the low voltage secondary 14 of a transformer 16 having a primary winding 15. The lower terminal of the low voltage secondary winding 14 is connected to the work pieces 13. It will be obvious that upon a current flowing through the primary winding 15, a voltage is induced in the secondary 14 which produces an arc between the electrode 12 and the work pieces 13.

It is desirable to vary the amount of current flowing between the welding electrode 12 and the work pieces 13 since for any one welding operation, there is an optimum amount of current. It is with the control of this current that our present invention is concerned.

The current through the primary winding 15 is controlled by two silicon controlled rectifiers (hereinafter referred to as SCR's) 17 and 18. Both of these are of conventional type. A typical SCR which has been found satisfactory is a 71RC50A. The SCR 17 consists of an anode 19, a cathode 20 and a gate electrode 21. Similarly, the SCR 18 has an anode 22, a cathode 23 and a gate electrode 24. The SCR's 17 and 18 both function in the conventional manner in that they remain nonconductive until a voltage is applied between the gate electrode and the cathode sufficient to cause firing of the SCR. When this happens, the impedance between the anode and cathode of the SCR drops to a very low value and current continues to flow between the anode and cathode, even though the voltage on the gate electrode 21 is removed, until such time as the voltage across the anode and cathode is removed. A further characteristic of this type of device, which will be mentioned in a later portion of the specification, is that the voltage applied to the gate electrode should be applied for only a brief period of time. The life of the SCR is shortened if the voltage is maintained on the gate electrode for any substantial period of time. The two SCR's 17 and 18 are connected back to back and in series with the primary 15 of the welding transformer between two power supply conductors 26 and 27. Connected in parallel with the two SCR's 17 and 18 are a pair of opposed diodes 29 and 30. These are connected back to back and have an inverse voltage drop somewhat below the maximum value that can be safely placed across the SCR's 17 and 18. These diodes thus act as a safety means to prevent an excessive voltage from being applied between the anodes and cathodes of the SCR's.

Inasmuch as a typical SCR will conduct independently of the voltage applied to the gate electrode, once the SCR breaks down, the output of these devices is normally controlled by varying the phase of the pulse applied to the gate electrode with respect to the voltage applied across the SCR. Our invention is more specifically concerned with controlling the phase of this pulse in such a manner that the phase of the pulse is unaffected by transient disturbances introduced into the system. Furthermore, it is highly essential that this same pulse be applied during each half cycle since if more current is allowed to flow in one half cycle than in another, a direct current component will be introduced into the primary of the transformer to, in turn, cause the magnetization of the transformer core to have a unidirectional component. This, in turn, results in excessive primary current during certain portions of the cycle, which in extreme cases may be so great as to blow fuses and shut down the equipment. We, accordingly, are concerned with means for insuring that the pulses applied to the gate electrodes 21 and 24 are the same.

While we have referred to half cycles above and while an alternating current is commonly referred to as consisting of two half cycles in one of which the instantaneous voltage is positive and in the other of which the instantaneous voltage is negative, it is possible to regard each half cycle as a "cycle." Since it is contemplated that the present invention could be utilized with a rectified source of current in which there would be a series of cycles of the same polarity, each of the same length as a half cycle of the alternating current from which the rectified current is derived, the term "cycle" as used hereinafter and in the claims will mean that portion of the voltage or current wave which periodically repeats whether in the positive or negative sense. Thus in the case of alternating current, we are using the term "cycle" to designate the portion of the current or voltage wave which is often referred to as a half cycle.

Referring now to the means for controlling the pulses applied to the gate electrodes 21 and 24, there is associated with the electrode handle 10 a rheostat 32, comprising a resistor 33 and a slider 34. This rheostat, as shown schematically, is located above the handle 10. In actual practice, however, it will be a relatively compact unit and will be mounted directly on the handle in such a manner as not to interfere with the use thereof. This rheostat 32 is so incorporated into the system as to control the phase of the firing pulses applied to gate electrodes 21 and 24.

Referring now to the left hand side of FIGURE 1, I have designated the pulse phasing circuit in its entirety by the reference numeral 35. The rheostat 32 forms part of this pulse phasing circuit. A transformer 37 is employed to energize the entire control system of our invention. This transformer comprises a primary winding 38 connected to line conductors 26 and 27, and a plurality of secondary windings 39, 40, 41 and 42. The secondary winding 39 is connected by conductors 45 and 46 to the input terminals 47 and 48 of a full wave rectifier bridge 49. The full wave rectifier bridge 49 functions in the conventional manner to provide full wave rectification of the output of secondary winding 39 so that a voltage appears across terminals 50 and 51 which corresponds to that shown in FIGURE 2a. One terminal of the rheostat 32 is connected by conductor 52 and resistor 53 to the output terminal 50. The other terminal of rheostat 32 is connected by conductor 54, a resistor 55 and a condenser 56 to a ground conductor 57 leading to the other output terminal 51 of the bridge 49. It will be apparent that the rheostat 32, the resistor 55 and the condenser 56 form a resistive capacitive circuit and that during each cycle, a voltage builds up across condenser 56 at a rate dependent upon the time constant of this R–C circuit which is dependent upon the setting of rheostat 32.

Connected in parallel with the rheostat 32, the resistor 55 and condenser 56 is a Zener diode 59 which has an inverse voltage drop somewhat less than the output voltage of the rectifier across terminals 50 and 51. The result is that this Zener diode acts to clip off the tops of each of the voltage waves to produce a resultant voltage wave very similar to that shown in FIGURE 2b. It will be noted that this voltage wave has relatively flat tops. It is this voltage which appears across the resistive capacitive circuit constituted by rheostat 33, resistor 55 and condenser 56. The voltage across condenser 56 is employed to control the potential applied to the emitter 62 of a unijunction transistor 63. The two base electrodes 64 and 65 of the unijunction transistor 63 are connected through resistors 66 and 67 respectively to the upper right hand terminal of resistor 53 and to ground conductor 57. It will be readily apparent that during each voltage pulse, the condenser 56 is charged at a rate dependent upon the setting of the rheostat 33. When the resistance of this rheostat is relatively low, the time constant of the circuit is correspondingly low and it requires a shorter time before the condenser 56 becomes fully charged, or until the voltage across condenser 56 attains a predetermined value. The voltage across condenser 56 is shown in FIGURE 2c.

Figure 2:
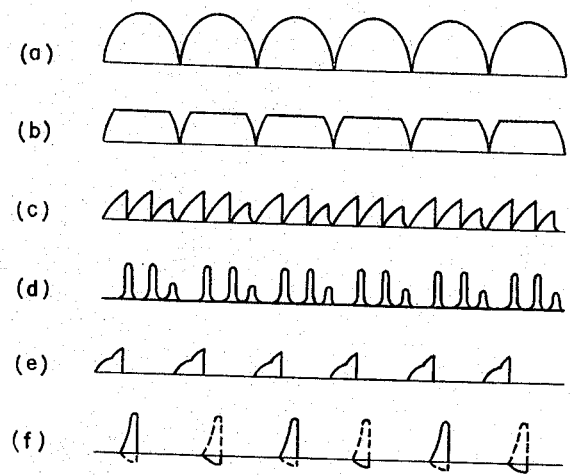
FIGURE 2 is a diagram depicting the voltages existing at various points in the circuit of FIGURE 1.

When the voltage reaches a predetermined value indicated by the peaks of the voltage waves shown in FIGURE 2c, the voltage is such as to render the unijunction transistor 123 conductive. When this happens, the voltage between the emitter 62 and the base electrode 65 drops abruptly, causing the condenser 56 to discharge through the resistor 67. As soon as the condenser 56 has discharged, the unijunction transistor 63 cuts off and the condenser 56 starts to charge again. If the time constant of the circuit is sufficiently short, the condenser 56 will repeatedly charge and discharge through the unijunction transistor. As will be pointed out later, it is only the initial pulse in any one cycle that has any significance. The final pulse in any one cycle may be relatively low since as the voltage across the base electrodes of the unijunction transistor decreases, the voltage required to render the unijunction transistor conductive likewise decreases so that at the end of the cycle, any remaining charge across the condenser 56 is discharged through the resistor 67. This results in a series of relatively sharp voltage pulses occurring across resistor 67 as shown in FIGURE 2d. Again, it is only the first of these voltage pulses in any one cycle that is of significance as far as the operation of the system is concerned.

Resistor 67 is connected to the primary winding 68 of a pulse transformer 69 having, in addition to the primary winding 68, a secondary widing 70. Because of transformer 69 being of the type which is capable of transmitting abrupt changes in current, voltage pulses appear across the secondary similar in character to that shown in FIGURE 2d. The pulse transformer 69 acts as a coupling transformer to separate the pulse forming circuit 35 from the rest of the control apparatus as far as the ground conductor is concerned. Since this pulse forming circuit 35 has associated with it the rheostat 32 which is connected by long leads with the rest of the pulse forming equipment, there is a danger that stray signals may be picked up in the leads 52 and 54. The transformer 69 thus tends to isolate this portion of the circuit from the rest of the apparatus while transmitting the pulses shown in FIGURE 2d.

The first pulse appearing across the secondary 70 in each cycle is used to control a pulse forming circuit 72. This pulse forming circuit comprises an SCR 73 which may be of the type known as a GEC20D. This SCR comprises an anode 74, a cathode 75 and a gate electrode 76. The lower end of secondary winding 70 is connected to a ground conductor 78 which in turn is connected through conductor 79 to the cathode 75. The upper end of secondary 70 is connected through resistor 80 and a rectifier 81 to the gate electrode 76 of the SCR 73. Thus, the voltage pulses appearing across the secondary 70 are applied between the gate electrode and the cathode 75 of SCR 73.

Direct current voltage is applied between anode 74 and cathode 75 of SCR 73 by a power supply consisting of secondary winding 40 of transformer 37 and a full wave rectifier bridge 82 having input terminals 83 and 84 and output terminals 85 and 86. The input terminals 83 and 84 are connected across the secondary winding 40. As a result a full wave rectified voltage appears across terminals 85 and 86. Since it is desired to bypass any tray high freqeuncy signals, a condenser 87 having a relatively small capacity is connected across the output terminals 85 and 86 of the bridge 82. The output terminal 86 is connected through conductor 88, ground conductor 78, and conductor 79 to the cathode 75. The positive output terminal 85 is connected through a resistor 89, a rectifier 90 and conductor 91 to the anode 74. Thus, the full wave rectified output of bridge 82 is applied between the anode and cathode 75 of the SCR.

Until a pulse is applied to the gate electrode 76, the SCR 73 remains nonconductive. Thus, as shown in FIGURE 2e, voltage across 73 builds up initially due to the sinusoidal build up of the full wave rectified voltage across the output terminals 85 and 86 of bridge 82. Superimposed upon this voltage but lagging slightly in phase is a further sinusoidal voltage applied from line conductors 26 and 27 through a circuit to be traced later.

When the pulse of FIGURE 2d is applied to the gate elctrode, the SCR 73 fires with the result that the voltage across it is dropped to a negligible value. This occurs whenever the first pulse occurs even if the further sinusoidal voltage from the line conductors 26 and 27 has not yet been applied. Since SCR 73 remains conductive, once it fires, any further pulses applied from transformer 69 during the voltage cycle have no effect. Thus, as shown in FIGURE 2e, the voltage between the anode and the cathode drops abruptly upon the initiation of the first trigger pulse in any one cycle and remains at a negligible value until the beginning of the next cycle. Thus, SCR 73 acts as a switch for controlling the pulse that is applied to the final SCR's 17 and 18, as will be presently explained.

Connected between the cathode 20 and gate electrode 21 of SCR 17 is a resistor 93, the lower terminal of resistor 93 being connected by a conductor 94, a current limiting resistor 95 and a rectifier 100 to the gate electrode 21 and the upper terminal being connected by conductors 96, 97 and 98 to the cathode 20. Connected in parallel with resistor 93 is a Zener diode 99 having an inverse voltage drop somewhat less than the maximum permissible gate voltage. The Zener diode 99 has two functions. In the first place, it limits the positive potential that is applied to the gate electrode 21. Since such a diode is freely conductive in its normal direction of conduction, it also serves to bypass any negative signals that might tend to be applied to the gate electrode. Rectifier 100 serves further to insure that no negative signals are applied to gate electrode 21.

A similar resistor 101 is connected between the gate electrode 24 and the cathode 23 of SCR 18. The upper terminal of resistor 101 is connected through a current limiting resistor 102 and a diode 103, the functions being the same as previously explained in connection with resistor 93 and diode 100. Similarly, a Zener diode 105 is connected in parallel with resistor 101 for the same purpose as Zener diode 99.

Very broadly touching upon the operation before describing further circuit components, when conductor 27 is positive with respect to conductor 26, a current flows through the primary winding 15 of the welding transformer, through the resistor 93, SCR 73 and the resistor 101. When conductor 26 is positive with respect to conductor 27, the current flows through the same units, lowing through SCR 73 in the same direction but through he primary 15 and resistors 93 and 101 in the opposite direction to that when the line conductor 27 is positive. It will be obvious that this current flow is prevented until the SCR 73 becomes conductive as a result of the first pulse being applied to its gate electrode 76 as above described. The circuit does, however, result in a further sinusoidal potential being applied across SCR 73 as referred to previously, if the SCR has not already fired. As will be described later, the application of this further potential is somewhat delayed so that the resulting wave form is that shown in FIGURE 2e, if the application of the first pulse is delayed sufficiently. Turning now to some of the components present in this circuit just referred to, the current through the two resistors 93 and 101 and SCR 73 passes through a rectifier bridge 108 having four diodes 109, 110, 111 and 112. The function of this bridge will be referred to in connection with the circuits as traced but it is broadly to insure that the voltage producing current flow through this circuit is applied only in the conductive direction of the SCR.

We have also provided means for insuring that the pulses produced across resistors 93 and 101 can only be applied to the associated gate electrode during the cycle in which the anode of the particular SCR which it is desired to fire is positive with respect to the cathode. This means includes a pair of SCR's 113 and 114 which are connected in parallel wth each other but in opposite directions between the resistor 93 and the rectifier bridge 108, both being in series with SCR 73. The secondary winding 41 is connected between the cathode and the gate electrode of SCR 113 through a current limiting resistor 115 and a rectifier 116 and the secondary winding 42 is connected between the gate electrode and cathode of SCR 114 through a current limiting resistor 118, and a rectifier 121. The two secondary windings 41 and 42 are so connected that during one cycle the gate electrode of one of the two transistors 113 and 114 is maintained positive while the gate electrode of the other is maintained negative. During the next cycle the first is maintained negative and that of the second, positive. Since the two SCR's pass current in opposite directions, it will be obvious that the current can only flow in the one direction through the circuit during any one cycle. It will also be clear that since SCR's 113 and 114 do not become conductive until the sinusoidal voltage applied to their gate electrodes rises sufficiently to fire the SCR in question, the application of the voltage to SCR 73 from line conductors 26 and 27 will be slightly delayed as shown in FIGURE 2e and as referred to above.

Turning now to the circuits through resistors 93 and 101, let us assume that the line conductor 27 is positive with respect to line conductor 26. A circuit may now be traced from line conductor 27 through primary winding 15, conductors 97 and 96, resistor 93, a conductor 117, SCR 114, diode 109 of bridge 108, a current limiting resistor 119, SCR 73, conductor 79, ground conductor 78, rectifier 112 of bridge 108, resistor 101, and conductor 120 back to the other line conductor 26. This current flow does not take place during the cycle under consideration until the pulse voltage from secondary winding 70 is applied to the gate electrode 76. When this happens, as previously explained, SCR 73 becomes fully conductive and the current flow through the path just traced can take place. The effect of this current flow as will be readily apparent is to cause the upper terminals of resistors 93 and 101 to become positive with respect to their lower terminals. In other words, the terminal of resistor 93 connected to the gate electrode 21 is negative so that it would have no effect on SCR 17. Furthermore, as will be readily apparent, the anode of SCR 17 is negative with respect to the cathode during this cycle so that no current flows through SCR 17. Turning now, however, to resistor 101, it will be noted that the voltage across resistor 101 is of such polarity as to cause a positive voltage to be applied to the gate electrode 24. Furthermore, since the anode 22 is positive with respect to the cathode 23, the SCR 18 will be caused to fire causing a large current to flow through the primary 15 of the welding transformer. At the same time, the voltage existing between conductor 97 and conductor 120 between which are connected resistors 93 and 101 and the SCR 73, drops to a negligible value. Thus, the circuit including the two resistors 93 and 101 and the SCR 73 is effectively shorted as a result of the firing of SCR 18. Consequently, the current flow through the two resistors in the SCR 73 abruptly terminates so that no appreciable voltage exists any longer across resistors 93 and 101. Thus, the voltage pulse appearing across resistor 101, for example, which is applied to the gate electrode 24 is substantially that shown in solid lines in FIGURE 2f. The voltage pulse does not build up immediately due to some inductive effect from primary winding 15. As soon, however, as the SCR 18 fires, this voltage drops abruptly. The result is a series of voltage peaks. As shown in FIGURE 2f and as will be presently explained, these peaks are of opposite polarity in successive cycles.

Turning now to the next cycle, in which line conductor 26 is positive with respect to line conductor 27, a current flow path may be traced from line conductor 26 through conductor 120, resistor 101, rectifier 111, resistor 119, SCR 73, ground conductor 78, rectifier 110, SCR 113, conductor 117, resistor 93, conductors 96 and 97 and primary winding 15, to the other line conductor 27. It will be noted that during this cycle, the lower terminals of resistors 93 and 101 are positive with respect to the upper terminals. Thus, the voltage which is applied to gate electrode 24 of SCR 18 is now negative and that applied to the gate electrode of SCR 17 is positive. Since the anode 22 of SCR 18 is likewise negative, it will be obvious that no current flows through SCR 18. In the case of SCR 17, however, the anode 19 is now positive with respect to the cathode and since a positive voltage is applied to the gate electrode 21, SCR 17 will fire, reducing the voltage drop across it to substantially a negligible value. Again, the voltage across the circuit including resistors 93 and 101 and SCR 73 is effectively wiped out so that current ceases to flow through resistors 93 and 101. The result is that the voltage across these resistors immediately terminates.

Referring to FIGURE 2f, the voltage pulses shown in solid lines are the voltage pulses existing across resistor 101, the voltage pulse being shown as positive when the lower end of the resistor 93 is positive with regard to the upper end. It will be seen that during every other cycle the voltage pulse is positive whereas in the alternate cycles, it is negative. The negative pulses are relatively small as compared with the positive pulses due to the shunting effect of the Zener diode 99. This Zener diode has two effects. As pointed out above, its inverse voltage drop is somewhat below the maximum voltage which can safely be applied between the gate electrode 21 and the cathode. Normally, unless an abnormally high voltage is applied across resistor 93, the Zener diode performs no function during the positive cycles, being merely a safety device. During the alternate cycles, however, when the upper terminal of resistor 93 is positive with respect to the lower terminal, the Zener diode conducts in its forward direction and since its voltage drop in this direction is relatively low, the Zener diode functioning as an ordinary diode acts to substantially short circuit the resistor 93. Thus, only a relatively small voltage appears across the resistor 93. Even this relatively small voltage is prevented from being applied to the gate electrode 21 by reason of the blocking action of rectifier 100.

Still referring to FIGURE 2f, I have shown the voltages appearing across resistor 93 in dotted lines. The voltage is shown as positive when the upper end of resistor 101 is positive with respect to the lower end. It will be seen that during the cycles in which the voltage across resistor 93 is negative, that across resistor 101 is positive. Furthermore, it will also be seen that the voltage across resistor 101 during the negative cycles is relatively small due to the shunting effect of Zener diode 105.

In the case of the voltage pulses appearing across both resistors 93 and 101, it will be noted that these pulses build up over an appreciable period of time due to the inductive effect of winding 15. As soon, however, as either SCR 17 or SCR 18 fires, this voltage drops immediately. The result is that the voltage pulses slope somewhat as they are built up but drop abruptly after reaching their peak value.

While various values of components can be employed, we have found it desirable in one particular embodiment to employ components having the following values. It is to be understood that these are illustrative only and hat the invention is in no way to be limited by the particular values of the components listed below.

Voltages: Volts
  Supply _____ 220
  Secondary 14 _____ 80
  Secondaries 39, 40 _____ 110
  Secondaries 41, 42 _____ 6.3
Condensers: Microfarad
  56 _____ .1
  87 _____ .03
Silicon controlled rectifiers:
  17, 18 _____ 71RC50A
  73 _____ C20D
  113, 114 _____ C20D
Resistors:
  33 _____kilohms__ 100
  53 _____do____ 5
  55 _____do____ 2.2
  66 _____ohms__ 330
  67 _____do____ 47
  80 _____do____ 100
  89 _____kilohm__ 1
  93 _____ohms__ 100
  95 _____do____ 47
  101 _____do____ 100
  102 _____do____ 47

*General operation of FIGURE 1*

In view of the foregoing explanation, it is believed that the general operation of FIGURE 1 is obvious. It will, however, be briefly summarized here.

During each cycle, a current flows through the resistive capacitor circuit including rheostat 32 and condenser 56. The condenser 56 charges at a rate dependent upon the time constant of the circuit. The smaller the resistance of rheostat 32, the faster the condenser 56 charges. As soon as it reaches a value sufficiently high to cause the unijunction transistor 63 to conduct, the condenser 56 discharges through resistor 67 to create the first voltage pulse shown in FIGURE 2d. It will be obvious that the phase position of this voltage pulse is dependent upon the time constant of the circuit including condenser 56 and rheostat 32. As rheostat 32 is adjusted to provide a smaller resistance, the time constant of the circuit including this rheostat and condenser 56 is reduced so that condenser 56 becomes charged more rapidly and discharges through the resistor 67 at an earlier point in the voltage cycle. Conversely if the resistance of the rheostat 32 is increased, the condenser 56 charges more slowly and the voltage pulse appears across resistor 67 at a later portion of the cycle. This voltage pulse is transmitted through the pulse transformer 69 to the gate electrode 76 to cause SCR 73 to fire at a point determined by the setting of rheostat 32. When the SCR 73 fires, it is possible for current to flow through resistor 93 or 101 as the case may be and through the diode 113 or 114, depending upon the cycle involved, through the rectifier bridge 108 and through the SCR 73. The voltage across the SCR 73 builds up sinusoidally, in accordance with the output of the bridge 82. The condenser 87 is of relatively small magnitude and has substantially no filtering effect upon current of the supply frequencies. Thus, the voltage appearing across the output terminals of 85 and 86 of the bridge 82 is substantially the same in character as that shown in FIGURE 2a. As soon, however, as the rectifier 73 becomes conductive, the voltage drop across this SCR drops abruptly due to the low impedance of the SCR. The current then starts flowing, as mentioned above, through resistor 93 or resistor 101 as the case may be. This current does not reach its maximum value for a predetermined period of time due to the inductive effect of winding 15 and to the fact that instantaneous value of the supply voltage is still increasing. As soon, however, as the voltage across resistor 93 or 101, as the case may be, reaches a value such as to cause firing of the SCR 17 or SCR 18, the voltage across the resistor 93 or 101 drops abruptly and no appreciable amount of current continues to flow through these resistors, through the rectifier bridge 108, and through the SCR 75.

As will be obvious, the SCR's 17 and 18 are alternately rendered conductive for periods of time dependent upon the setting of rheostat 32. Thus, it is possible to vary in very small steps the amount of welding current flowing between the electrode 12 and the work pieces 13.

It will be noted that a single set of electronic components are used for generating the pulses applied to the gate electrode of both SCR's 17 and 18. In some prior arrangements, it has been proposed to employ one set of components for generating the pulse to one SCR and another set of components for generating the pulse to the other SCR. If the components associated with the gate electrode of one SCR vary slightly in their characteristics from the components for controlling the gate electrode of the other SCR, a difference of firing time in successive cycles will result with the resultant introduction of a direct current component into the primary current of the transformer 16. As pointed out previously, this is undesirable. The optimum condition for operation of such a transformer is to have two exactly equal and opposite pulses on successive cycles.

It will also be seen that if there is any tendency for the phase to shift between the voltages appearing across SCR's 17 and 18, this is not aggravated by our system in which the pulses are generated in a system which is energized independently of the final SCR's. The timing of the pulse is determined by the portion of the circuit designated by the reference numeral 35 and this portion of circuit is energized by the power supply completely independently of the voltage drop across SCR's 17 and 18. Similarly, the switching SCR 73 likewise has a potential applied to it which is independent of the voltage across SCR's 17 and 18. Thus, the firing of SCR 73 remains completely independent of what happens in the circuit including the SCR's 17 and 18.

It will also be seen that regardless of some shifting of the voltages appearing across SCR's 17 and 18, the pulse generated by the system will be applied to SCR 17 or SCR 18 when a voltage sufficient to fire the SCR exists and can be only applied to the SCR to be fired during the cycle in which the anode of that SCR is positive with respect to its cathode, due to SCR's 113 and 114, and cannot be applied to the other SCR so that even though the anode of the other SCR tends to become positive before the end of the previous cycle, no voltage is applied to its gate electrode and it cannot be fired ahead of the cycle in which it is supposed to be fired.

Figure 3:
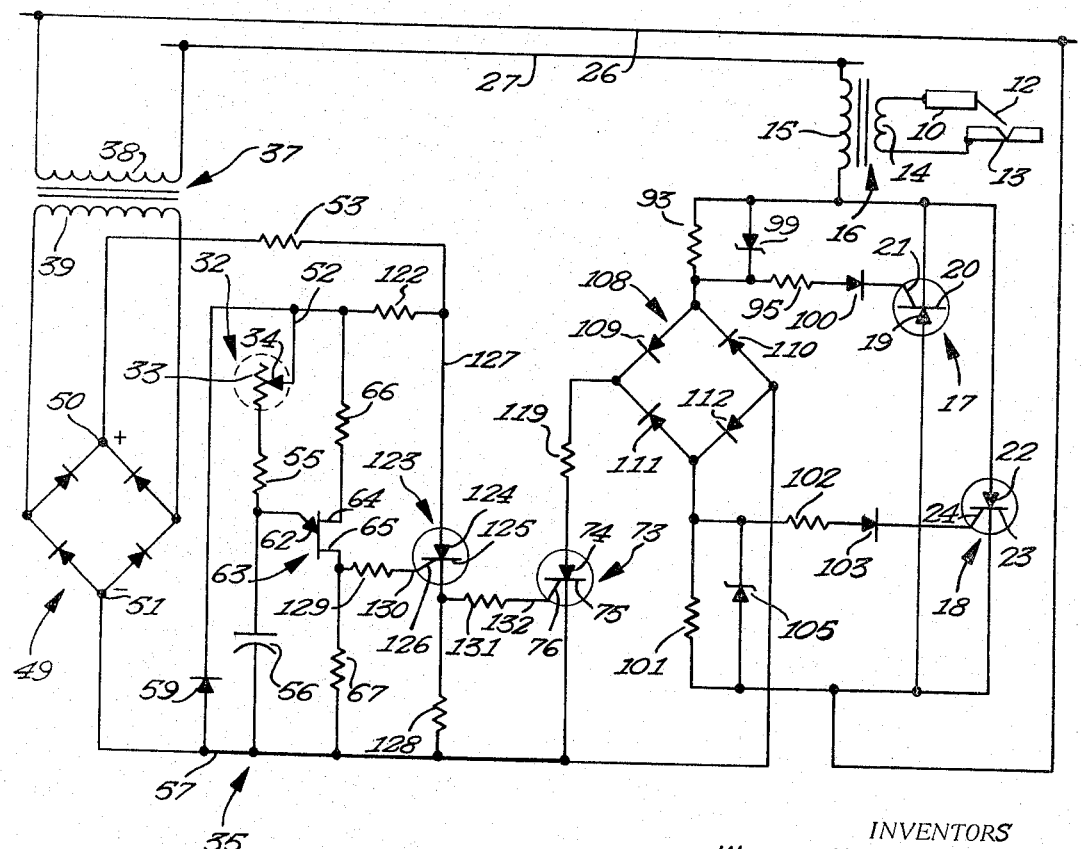
FIGURE 3 is a modification of our improved current control apparatus.

Species of FIGURE 3

In FIGURE 3, we have shown a modification of the preferred embodiment of FIGURE 1. In order to enable a ready comparison of the two circuits, we have used identical reference characters in connection with elements of the circuit which are identical to those shown in FIGURE 1. Furthermore, in order to simplify the description, we have not described again in detail those portions of the circuit which are the same as in FIGURE 1.

It will be noted that there is a welding transformer 16, the secondary 14 of which supplies welding current between an electrode 12 and work pieces 13. The current through the primary winding 15 of this welding transformer is controlled by two SCR's 17 and 18. As with the other previously described species, these SCR's are controlled by producing a voltage pulse across resistor 93 in one cycle and across resistor 101 in the next cycle and the phase of these voltage pulses is determined by a variable phase pulse trigger unit which is controlled by a variable rheostat 32. In the present drawing, the rheostat 32 is shown as located adjacent to the other elements with which it is electrically connected. It is to be understood that this rheostat 32 would be located on the handle 10 of the welder just as in the preferred species, it being merely shown adjacent to the other circuit elements in this figure and in FIGURE 4 as an aid to understanding the circuit.

As with the preferred species, power is supplied to the pulse phasing circuit 35 by a transformer 37. In the present case, the transformer has only the single secondary 39 which is connected to the input terminals of the bridge 49 as in the preferred species. The positive output terminal 50 is connected through a resistor 53 and a resistor 122 to conductor 52 extending to the slider 34 of the rheostat 32. The lower terminal 51 of the rectifier bridge 49 is connected to the ground conductor 57. As with the preferred species, the rheostat 32 is connected in series with resistor 55 and condenser 56 across the output terminals 50 and 51 of the rectifier bridge 49. The voltage across condenser 56 is applied between the emitter 62 and the base electrode 65 of the unijunction transistor 63 just as in the preferred species. Thus, voltage pulses are produced across resistor 67 connected between base electrode 65 and ground as with the apparatus of FIGURE 1.

In the apparatus of FIGURE 3, an additional SCR 123 is provided in lieu of providing the secondary winding 40 and the rectifier bridge 82 of FIGURE 1. This SCR may be a GE C–20B and comprises an anode 124, a cathode 125 and a gate electrode 126. The anode 124 is directly connected through conductor 127 with the right hand terminal of resistor 53. The cathode 125 is connected through resistor 128 to the ground conductor 57. The upper terminal of resistor 67 is connected to the gate electrode 126 of SCR 123 through a current limiting resistor 129 and a conductor 130.

When the first voltage pulse appears across resistor 67, at a time in the voltage cycle depending upon the setting of rheostat 32, the pulse is applied through resistor 129 and conductor 130 to the gate electrode 126 and causes the SCR to become conductive. The SCR then remains conductive during the entire remaining cycle and any further voltage pulses across resistor 67 have no effect. As a result, a voltage appears across resistor 128 which voltage is relatively constant, the voltage starting with the initiation of the first pulse from resistor 67 and terminating at the end of the cycle. The voltage is relatively constant due to the clipping effect of the Zener diode 59 which is connected across the anode and cathode of SCR 123 and which causes a voltage to be applied to its similar to that shown in FIGURE 2b.

The voltage appearing across resistor 128 is applied through a current limiting resistor 131 and conductor 132 to the gate electrode 76 of SCR 73. As soon as the voltage appears across resistor 128, the application of this voltage to the gate electrode 76 renders SCR 73 conductive for the remaining portion of the half cycle. As previously explained in connection with FIGURE 1, the current can then flow through the primary 15 of the welding transformer, resistors 93 and 101, the rectifier bridge 108 and SCR 73. Since this circuit is basically the same as with preferred species, it need not be repeated here. As with the preferred species of FIGURE 1, the resultant positive voltage produced across resistor 93 or 101 causes firing of SCR 17 or SCR 18. In either event, the firing of this SCR shunts the portion of the circuit including the anode and cathode of SCR 73 so that current ceases to flow. Thus, a voltage pulse of relatively short duration is produced across resistor 93 in one cycle and 101 in the next cycle. The operation of the portion of the circuit involving resistors 93 and 101 and SCR's 17 and 18 is the same as in connection with FIGURE 1 and need not be repeated in detail here. It is sufficient to point out that the SCR's 17 and 18 are alternately rendered conductive during the successive cycles for periods of time dependent upon the setting of rheostat 32.

Referring now to the over-all operation of FIGURE 3, as with the arrangement of FIGURE 1, the setting of the rheostat 32 determines the time constant of the circuit including this rheostat and condenser 56. This results in the condenser 56 discharging through the path including the emitter 62 and the lower base electrode 65 of unijunction transistor 63 at a time in the cycle dependent upon the setting of rheostat 32. The first pulse voltage appearing across resistor 67 then triggers the SCR 123 at a time in the voltage cycle dependent on the occurrence of the pulse. The SCR 123 remains conductive during the remainder of the cycle to produce a relatively long voltage pulse across resistor 128 which begins at a time determined by the occurrence of the voltage pulse across resistor 67 and terminates at the end of the cycle. This pulse is applied to the gate electrode 76 of SCR 73. The voltage across the anode and cathode of SCR 73, in the present embodiment, is entirely due to the voltage across SCR's 17 and 18. This is of significance in two respects. In the first place, as with FIGURE 1, the firing of either SCR 17 or SCR 18 terminates the voltage across the anode and cathode of SCR 73 and terminates the positive voltage pulse produced across resistor 93 or 101, as the case may be. The fact that the voltage across SCR 73 is the voltage across the SCR's 17 and 18 is also important in another respect. As earlier pointed out, this voltage may shift somewhat in phase due to the inductive effect of transformer winding 15. The result is that the occurrence in the cycle of the voltage across the anode and cathode of SCR 73 may vary somewhat. If only a voltage pulse were applied to the gate electrode 76, this pulse might occur prior to the time that the voltage was applied between the anode and cathode of SCR 73 with the result that this SCR would not be fired. Because, however, the voltage applied to the gate electrode 76 is of relatively long duration, it is assured that the voltage will be present and the voltage appears across the SCR 73 even though it is shifted slightly in phase from that of the power supply.

It will be noted that we have not shown in connection with FIGURE 3, the arrangement including rectifiers 113 and 114 and secondary windings 41 and 42. This is a desirable feature and can well be included in the arrangement of FIGURE 3. The apparatus is operable, however, in most cases without this expedient and it has been omitted in FIGURE 3 for purposes of simplicity.

It will be seen that the essential difference between the circuits of FIGURES 1 and 3 is that in the former, only one silicon controlled rectifier is located between the initial pulse phasing circuit 35 and the resistors 93 and 101 connected to the gate electrodes 21 and 24 of SCR's 17 and 18 This requires, however, a separate source of rectified voltage which is applied by the secondary winding 40 and the bridge 82 to insure the firing of SCR 73 even before the voltage appears across SCR's 17 and 18. In FIGURE 3, however, two SCR's 123 and 73 are provided. The further rectified source of power is unnecessary in view of the fact that the voltage produced by SCR 123 is relatively long in duration and, in this manner, insures the firing of SCR 73 regardless of when the voltage across SCR's 17 and 18 is applied across SCR 73.

*Species of FIGURE 4*

In FIGURE 4, we have shown a further modification of our invention. In this modification, we employ only a single rectifier in series with the primary 15 of the welding transformer 16. In lieu of employing two SCR's, we employ one SCR and a rectifier bridge having a current capacity sufficiently large to handle the current through the primary 15. The pulses to this single SCR are then controlled in a manner very similar to that shown in connection with FIGURE 3.

As with FIGURE 3, we have used the same reference characters as in FIGURES 1 and 3 for describing elements which are unchanged in FIGURE 4. Furthermore, the description of some of the components which are the same as in FIGURES 1 or 3 will not be repeated here since it is believed that this in unnecessary in view of the prior description of these elements and their operation.

Referring now specifically to FIGURE 4, the single SCR in series with the primary winding 15 is designated by the reference numeral 140. This SCR, which may be of the type commercially known as a 71RC50A SCR, has an anode 141, a cathode 142 and a gate electrode 143. A resistor 144 is connected across the anode and cathode to aid in extinguishing the SCR at the end of the voltage cycle.

In order the use the single SCR 140 during both the positive and negative cycles of the power supply, a rectifier bridge 146 is employed. This bridge comprises four rectifiers 147, 148, 149, and 150. It will be, of course, understood that the rectifier bridge will be of relatively high current carrying capacity. For example, in one embodiment, it is necessary to employ in bridge 146, rectifiers having a 70 ampere rating while silicon diodes having only a 750 milliampere capacity were employed in rectifier bridge 49. The voltage applied to gate 143 of SCR 140 is determined by the voltage developed across a resistor 151 connected between the cathode 75 of SCR 73 and ground conductor 57. This voltage is applied through current limiting resistor 152 and a rectifier 153 to the gate 143. Connected parallel to resistor 151 is a Zener diode 155. It will be understood that the Zener diode 155, the resistor 152 and rectifier 153 have similar functions to the corresponding Zener diode 99, resistor 95 and rectifier 100 in FIGURE 1. The anode 74 of rectifier 73 is connected through a resistor 157 and conductors 158 and 159 to the anode 141.

It will be understood that the operation of the pulse phasing circuit 35 of FIGURE 4 is the same as that of FIGURE 3. A voltage will appear across resistor 128 which starts at that portion of the cycle determined by the appearance of the first voltage pulse across resistor 67 which, in turn, is determined by the setting of the rheostat 32. This voltage is applied to the gate electrode 76 of SCR 73. When this happens, a current can flow through the SCR 73 through the following circuit during the cycles in which line conductor 27 is positive with respect to line conductor 26, from line conductor 27 through primary 15, rectifier 147, conductors 161 and 158, resistor 157, the anode 74 and cathode 75 of SCR 73, resistor 151, ground conductor 57, rectifier 150 and conductor 163 back to the other line conductor 26. The current flow through SCR 73 creates a voltage across resistor 151 which is applied to the gate electrode 143 of SCR 140 to cause the SCR 140 to become conductive. The current then can flow from line conductor 27 through primary winding 15, rectifier 147, conductors 161 and 159, the anode and cathode of SCR 140 and conductor 165 to ground conductor 57, rectifier 150 and conductor 163 back to the other line conductor 26. It will be noted that the SCR 73 is parallel with SCR 140 so that as soon as the latter fires, no appreciable voltage exists across SCR 73. The result is that the voltage across resistor 151 drops abruptly to remove any voltage from gate 143. As previously pointed out, it is desirable to minimize the amount of time during which a voltage is applied to the gate electrode.

At the end of the half cycle just traced, the voltage is removed between the anode and cathode of SCR 140. Due to the fact that there is some capacitive effect in the circuit, the voltage applied between the anode and cathode may not drop completely to zero. The resistor 144 in parallel with the SCR 140 has the function of bypassing part of the current which would tend to continue to flow through SCR 140 and of causing the SCR 140 to become completely extinguished.

At the beginning of the next cycle, when line conductor 26 is positive with respect to line conductor 27, and a voltage is applied to gate electrode 76 at a time dependent upon the setting of rheostat 32, current can flow from line conductor 26 through conductor 163, rectifier 149, conductors 161 and 158, resistor 157, the SCR 73, resistor 151, ground conductor 57, rectifier 148 and primary winding 15 back to the other line conductor 27. Again, a voltage is produced across resistor 151 which is applied to the gate electrode 143 to fire SCR 140. When this fires, due to the fact that SCR 140 is parallel with SCR 73, SCR 73 will become extinguished and the voltage across resistor 151 will cease to exist. It is believed unnecessary to again trace the circuit of SCR 140 during the cycle when line conductor 26 is positive with respect to line conductor 27 since this circuit is the same through the primary 15 and the rectifier bridge 146 as that just traced in connection with the circuit through SCR 73.

It will be obvious that as with the preceding species, the current flow through the welding transformer takes place each cycle in opposite directions for portions of the cycle determined by the setting of the rheostat 32. It will also be obvious that the means for determining the phase of the pulse is energized as in the other species independently of the voltage existing across the SCR in series with the primary winding 15. It will also be obvious that there is only a single pulse forming means for both cycles so that there is no danger of a pulse of one magnitude being supplied during one cycle which is different from that supplied during the other cycle.

*Conclusion*

It will be seen that we have provided a novel current control apparatus for controlling the current to an inductive load such as the primary winding of a welding transformer. With our invention, the phase of the controlled pulses applied to the rectifiers in series with the inductive load is unaffected by any shifting in the phase across the rectifier itself. It will be further seen that I have provided a means for insuring that the control pulses are always the same during each cycle so as to secure uniformity in the current supplied during each cycle and to eliminate any direct current component in the welding current.

While we have shown certain specific embodiments for purposes of illustration, it is to be understood that our invention is limited only by the scope of the appended claims.

What is claimed is:

1. In apparatus for controlling the current flowing to an inductive load; current control means connected to an inductive load and a source of cyclically varying power and operative during successive cycles of said source of power to control current flow in opposite directions through said inductive load; said current control means having a relatively low impedance when conductive and having control element means effective when a predetermined voltage is applied to said control element means to become conductive and to remain conductive after said control voltage is removed from said control element means; a voltage pulse generating means for generating a voltage pulse each cycle; means for applying the voltage pulses generated by said generating means to the control element means of said current control means to cause said current control means to become conductive for varying periods of time dependent upon the point in the voltage cycle at which the pulse was first applied to the control element means thereof; controlling means connected to said voltage pulse generating means for producing a control pulse to initiate during each cycle the operation of said voltage pulse generating means and including an adjustable device for varying the portion of the voltage cycle across said current control means at which said control pulse is generated and hence the portion of the cycle at which said voltage pulses are applied to said control element means; means for energizing said voltage pulse generating means in accordance with the voltage across said current control means so that when said current control means becomes conductive, said pulse generating means is no longer energized; means for energizing said controlling means from a source of power independent of the voltage across said current control means so that the initiation of the pulse is unaffected by any phase shifting of the voltage across said current control means by reason of the inductive load in series therewith, and means for maintaining the effect of said control pulse on said voltage pulse generating means in any cycle until said voltage pulse generating means has produced the voltage pulse to cause conduction of the current control means.

2. In apparatus for controlling the current flowing to an inductive load; rectifier means connected to an inductive load and a source of alternating power and operative during successive cycles of said source of power to control current flow in opposite directions through said inductive load; said rectifier means having a relatively low impedance when conductive and control element means effective when a predetermined voltage is applied to said control element means to become conductive and to remain conductive after said control voltage is removed from said control element means; a voltage pulse generating means for generating a voltage pulse each cycle; means for applying the voltage pulses generated by said generating means to the control element means of said rectifier means to cause said rectifier means to become conductive for varying periods of time dependent upon the point in the voltage cycle at which the pulse was first applied to the control element means thereof; controlling means connected to said voltage pulse generating means for producing a control pulse to initiate during each cycle the operation of said voltage pulse generating means and including an adjustable device for varying the portion of the voltage cycle across said rectifier means at which said control pulse is generated and hence the portion of the cycle at which said voltage pulses are applied to said control element means; means for energizing said voltage pulse generating means in accordance with the voltage across said rectifier so that when said current control means becomes conductive, said pulse generating means is no longer energized; means for energizing said controlling means from a source of power independent of the voltage across said rectifier means so that the initiation of the pulse is unaffected by any phase shifting of the voltage across said rectifier means by reason of the inductive load in series therewith, and means for maintaining the effect of said control pulse on said voltage pulse generating means in any cycle until said voltage pulse generating means has produced the voltage pulse to cause conduction of the current control means.

3. The apparatus of claim 2 in which the rectifier means is conductive in only one direction and is connected in series with said inductive load and source of alternating power through a full wave rectifier so as to control current flow in opposite directions through said inductive load.

4. The apparatus of claim 1 in which the inductive load is the primary winding of a welding transformer having a secondary winding adapted to be connected between a welding electrode and a work piece on which welding is to be performed.

5. The apparatus of claim 1 in which the inductive load is the primary winding of a welding transformer having a secondary winding connected to a welding electrode assembly and in which the adjustable device of the controlling means is located in proximity to the welding electrode assembly to facilitate ready adjustment of the welding current.

6. The apparatus of claim 1 in which the controlling means includes a resistive capacitive circuit in which the time constant of the circuit determines the phase position of the control pulse and in which the adjustable device of said controlling means is an adjustable resistor connected in said resistive capacitive circuit for varying the time constant thereof.

7. In apparatus for controlling the current flowing to an inductive load; a plurality of rectifiers connected in opposite conductive directions in series with an inductive load and a source of alternating power and operative during successive cycles of said source of power to cause current to flow in opposite directions through said inductive load; each of said rectifiers having a relatively low impedance when conductive and having a control element effective when a predetermined voltage is applied to said control element to become conductive and to remain conductive after said predetermined voltage is no longer applied to said control element; a voltage pulse generating means for generating a voltage pulse each cycle; means for alternately applying the voltage pulses generated by said generating means to the control elements of said rectifiers including switching means controlled by the source of power for preventing a pulse from being applied to the control element of a rectifier during a cycle in which the polarity of the voltage applied across the rectifier is opposite to its direction of conductivity, said last named voltage applying means being effective to cause said rectifiers to become alternately conductive for varying periods of time dependent upon the point in the voltage cycle at which the pulse was first applied to the control elements thereof; controlling means including an adjustable device for varying the portion of the voltage cycle across said rectifiers at which said pulses are applied to said control elements; means for energizing said pulse generating means in accordance with the voltage across said rectifiers so that when said current control means becomes conductive, said pulse generating means is no longer energized; and means for energizing said controlling means from a source of power independent of the voltage across said rectifier so that the initiation of the pulse is unaffected by any phase shifting of the voltage across said rectifiers by reasn of the inductive load in series therewith.

8. The apparatus of claim 2 in which the rectifier means comprises one or more silicon controlled rectifiers of the type having an anode, a cathode, and a gate electrode, and in which the control element means comprises the gate electrode or electrodes of the rectifier means.

9. In combination, a first silicon controlled rectifier having an anode, a cathode, and a gate electrode; means for connecting the anode and cathode of said rectifier to a load and to a source of alternating power to control the current flow through the load; an impedance so connected between the gate electrode and cathode that when a voltage drop of a predetermined polarity appears across said impedance said first rectifier is rendered conductive; a further silicon controlled rectifier connected to a source of power in series with said impedance and in parallel with the anode and cathode of said first rectifier, said further silicon controlled rectifier having a gate electrode; adjustable control means for applying to said gate electrode of said further rectifier a voltage whose phase position is adjustably variable and which is of a magnitude and polarity to initiate conduction of said further rectifier to cause current flow through said impedance, said further rectifier being connected to said impedance in such a direction that the resulting voltage drop across said impedance due to said further rectifier being conductive causes a voltage drop of said predetermined polarity across said impedance to cause said first rectifier to become conductive, said parallel connection of said further rectifier with the anode and cathode of said first rectifier being effective upon said first rectifier becoming conductive to result in the removal of the voltage across said further rectifier to cause it to cease conduction; and means for energizing said adjustable control means from a source of power independent of the voltage drop across said first rectifier.

10. The apparatus of claim 9 in which the adjustable control means comprises a resistive capacitive circuit in which the resistance is an adjustable resistor and the capacitance is a capacitor which causes a voltage pulse to be formed when the voltage across said capacitor reaches a predetermined value.

11. In apparatus for controlling the current flowing to a reactive load; a rectifier connected to a reactive load and a source of alternating power and operative during alternate cycles of said source of power to control current flow through said reactive load; said rectifier having a control element and effective when a predetermined voltage is applied to said control element to become conductive and to remain conductive as long as a voltage of the correct polarity is applied across said rectifier regardless of the subsequent voltage applied to said control element; a voltage pulse generating means for generating a voltage pulse during each cycle said rectifier is to conduct; means for applying the voltage pulses generated by said generating means to the control element of said rectifier to cause said rectifier to become conductive for varying periods of time dependent upon the point in the voltage cycle at which the pulse was first applied to the control element thereof; controlling means including an adjustable device for initiating each pulse at a selected point in the voltage cycle of said power supply regardless of the voltage across said rectifier; and means for terminating said pulse as soon as said rectifier becomes conductive.

12. The apparatus of claim 2 in which the rectifier means consists of a plurality of rectifiers connected in opposite conductive directions in series with the inductive load, each of said rectifiers having a control element and effective when a predetermined voltage is applied to said control element to become conductive and to remain conductive as long as a voltage of the correct polarity is applied across said rectifier.

13. In combination, first and second silicon controlled rectifiers each having an anode, a cathode, and a gate electrode; means for connecting the anodes and cathodes of said rectifiers in parallel but opposed directions to each other and to a load and a source of alternating power to control the current flow through the load during opposite cycles of the power source; a first impedance connected between the gate electrode and cathode of said first rectifier; a second impedance connected between the gate electrode and cathode of said second rectifier; an electronic switching device having a gate electrode for initiating conductivity of said switching device, said switching device being connected to said source of alternating power in series with said first and second impedances and in parallel with the anodes and cathodes of said first and second rectifiers and in a circuit such that when said switching device is conductive the current flow through the resistors produces a voltage between the gate electrode and the cathode of the associated rectifier in phase with the voltage applied between the anode and cathode of said rectifier for that cycle of the power source; and adjustable control means for applying during each cycle to said gate electrode of said electronic switching device a voltage whose phase position is adjustably variable and which is of a magnitude and polarity to initiate conduction of said switching device to cause current flow through said impedances to cause said first rectifier to become conductive during one cycle and the second rectifier to become conductive during the next cycle, said parallel connection of said switching device with the anodes and cathodes of said first and second rectifiers being effective upon either said first or said second rectifier become conductive to result in the removal of the voltage across said switching device to cause it to cease conduction.

References Cited by the Examiner

UNITED STATES PATENTS

| | | | |
|---|---|---|---|
| 2,873,421 | 2/1959 | Mierendorf | 323—24 X |
| 3,128,422 | 4/1964 | Brown | 323—22 |
| 3,159,766 | 12/1964 | Harpley | 315—279 X |
| 3,205,404 | 9/1965 | Kurata et al. | 315—100 |
| 3,207,975 | 9/1965 | Pintell | 307—88.5 |

OTHER REFERENCES

General Electric Silicon Controlled Rectifier Manual (3rd edition, 1964, pages 137–138).

JAMES W. LAWRENCE, *Primary Examiner.*

S. A. SCHNEEBERGER, *Assistant Examiner.*